United States Patent
Takahashi et al.

(10) Patent No.: US 10,493,694 B2
(45) Date of Patent: Dec. 3, 2019

(54) SHAPING METHOD AND SHAPED OBJECT

(71) Applicant: HONDA MOTOR CO., LTD., Minato-ku, Tokyo (JP)

(72) Inventors: Keisuke Takahashi, Tochigi-ken (JP); Masahito Kimori, Tochigi-ken (JP); Akio Shimoda, Tochigi-ken (JP); Yusuke Hayatsu, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/143,495

(22) Filed: Sep. 27, 2018

(65) Prior Publication Data

US 2019/0099944 A1  Apr. 4, 2019

(30) Foreign Application Priority Data

Sep. 29, 2017  (JP) ................. 2017-190254

(51) Int. Cl.
| | |
|---|---|
| *B33Y 30/00* | (2015.01) |
| *B29C 64/153* | (2017.01) |
| *B29C 64/245* | (2017.01) |
| *B29C 64/273* | (2017.01) |
| *B33Y 80/00* | (2015.01) |
| *B33Y 10/00* | (2015.01) |
| *B29L 31/00* | (2006.01) |

(52) U.S. Cl.
CPC .......... *B29C 64/153* (2017.08); *B29C 64/245* (2017.08); *B29C 64/273* (2017.08); *B29L 2031/7732* (2013.01); *B33Y 10/00* (2014.12); *B33Y 30/00* (2014.12); *B33Y 80/00* (2014.12); *Y10T 428/24182* (2015.01)

(58) Field of Classification Search
CPC .......... Y10T 428/24182; B29C 64/153; B29C 64/245; B29C 64/273; B22F 3/00; B29L 2031/7732; B33Y 30/00; B33Y 80/00
See application file for complete search history.

(56) References Cited

U.S. PATENT DOCUMENTS

| | | |
|---|---|---|
| 10,180,072 B2 | 1/2019 | Roberts et al. |
| 2013/0065073 A1 | 3/2013 | Fuwa |

(Continued)

FOREIGN PATENT DOCUMENTS

| | | |
|---|---|---|
| CN | 107638231 | 1/2018 |
| JP | 3557970 | 6/2001 |

(Continued)

*Primary Examiner* — Alexander S Thomas
(74) *Attorney, Agent, or Firm* — Amin, Turocy & Watson, LLP

(57) ABSTRACT

A shaped object shaped by a shaping method includes a structure that is shaped by stacking plural constituent layers and a ceiling wall to support the structure. The structure includes plural spiral form parts. Each spiral form part has a cross section in an elliptic shape and extends in a stacking direction while turning with respect to a center position of the elliptic shape. The plural spiral form parts are disposed in matrix in a state where the center positions are separated from each other by a predetermined distance. The spiral form parts that are adjacently disposed in a row direction and a column direction are shaped so that the turning directions are opposite. In at least one cross section of the structure, the major axes of the spiral form parts that are adjacent in the row direction and the column direction are orthogonal to each other.

18 Claims, 4 Drawing Sheets

(56) References Cited

U.S. PATENT DOCUMENTS

2013/0171019 A1    7/2013   Gessler et al.
2014/0175708 A1    6/2014   Echigo et al.

FOREIGN PATENT DOCUMENTS

| JP | 5779839 | 5/2011 |
|---|---|---|
| JP | 6021159 | 9/2013 |
| JP | 2014-125643 | 7/2014 |
| JP | 2016-102573 | 6/2016 |
| JP | 6167195 | 7/2016 |
| JP | 2017-082773 | 5/2017 |
| JP | 2017-106046 | 6/2017 |

SHAPING METHOD AND SHAPED OBJECT

CROSS-REFERENCE TO RELATED APPLICATION

This application is based upon and claims the benefit of priority from Japanese Patent Application No. 2017-190254 filed on Sep. 29, 2017, the contents of which are incorporated herein by reference.

BACKGROUND OF THE INVENTION

Field of the Invention

The present invention relates to a shaping method for obtaining a three-dimensional shaped object from a powder layer including powder by irradiating the powder layer with a light beam, and also relates to a shaped object that is shaped by the shaping method.

Description of the Related Art

For example, as described in Japanese Laid-Open Patent Publication No. 2014-125643, it has widely been performed that a three-dimensional shaped object is formed by depositing powder so that a powder layer is formed, and irradiating the powder layer with a light beam so that the powder layer is sintered or the powder is melted and fixed.

SUMMARY OF THE INVENTION

Here, it has been requested to reduce the weight of the shaped object to cut down costs. In this case, the shaped object may be hollow to reduce the material. However, when the shaped object is made hollow simply, the rigidity of the shaped object decreases and it is difficult to shape a ceiling wall of the shaped object. Therefore, in order to perform the shaping on a part where there is no shaped layer, a base that is called a support material needs to be shaped and disposed. As a result, it is difficult to reduce the cost.

In view of the above, an object of the present invention is to provide a shaping method for easily shaping a shaped object with a smaller weight while suppressing the decrease in rigidity, and a shaped object that is shaped by the shaping method.

A first aspect of the present invention is a shaping method for shaping a shaped object including a structure and a ceiling wall configured to support the structure by using a three-dimensional shaping apparatus, the method including: a structure shaping step of shaping the structure, by shaping a constituent layer constituting a part of the structure by irradiation with a light beam, repeatedly a predetermined number of times, so that the constituent layers are stacked into the structure; and a ceiling wall shaping step of shaping the ceiling wall by irradiation with the light beam, wherein: the constituent layer includes a plurality of spiral constituent parts; the spiral constituent part has a shape in which, when viewed from a stacking direction, a major axis and a minor axis are orthogonal to each other, the major axis corresponding to an axis including a longest direct distance from a center position of the spiral constituent part to an outer periphery of the spiral constituent part and the minor axis corresponding to an axis including a shortest direct distance from the center position to the outer periphery of the spiral constituent part; the spiral constituent parts are disposed in matrix in a state where the center positions thereof are separated from each other by a predetermined distance; and in the structure shaping step, the structure that includes a plurality of spiral form parts each extending in the stacking direction while turning with respect to the center position is shaped by the irradiation with the light beam so that, in every shaping of the constituent layer, the spiral constituent parts that are adjacent in a row direction and a column direction are in a state of being turned with respect to the center position by a predetermined angle in opposite directions.

In the shaping method according to the first aspect of the present invention, in at least one constituent layer of the constituent layers that are stacked, the major axes of the spiral constituent parts that are adjacent in the row direction and the column direction may be orthogonal to each other.

In the shaping method according to the first aspect of the present invention, in the spiral constituent parts that are adjacent in the row direction and the column direction and whose major axes are orthogonal to each other, an end on a major axis side and an end on a minor axis side may be in contact with each other.

In the shaping method according to the first aspect of the present invention, in at least one constituent layer of the constituent layers that are stacked, the major axes of the spiral constituent parts may be parallel to each other.

In the shaping method according to the first aspect of the present invention, in the constituent layer where the major axes of the spiral constituent parts are parallel to each other, ends of the spiral constituent parts on a major axis side that are diagonally adjacent to each other with respect to the row direction and the column direction may be in contact with each other.

In the shaping method according to the first aspect of the present invention, a ratio of a length of the major axis to a length of the minor axis of the spiral constituent part may be at least 2.8 to 1.

In the shaping method according to the first aspect of the present invention, the spiral constituent part may have a shape along the major axis that is symmetric about the minor axis when viewed from the stacking direction.

In the shaping method according to the first aspect of the present invention, the spiral constituent part may have an elliptic, oval, or rhombic shape when viewed from the stacking direction.

A second aspect of the present invention is a shaped object fabricated by using a three-dimensional shaping apparatus, including a structure that is shaped by stacking a plurality of constituent layers and a ceiling wall configured to support the structure, wherein: the structure includes a plurality of spiral form parts each extending in a stacking direction while turning with respect to a center position; a cross section of the spiral form part has a shape in which a major axis and a minor axis are orthogonal to each other, the major axis corresponding to an axis including a longest direct distance from the center position to an outer periphery of the spiral form part and the minor axis corresponding to an axis including a shortest direct distance from the center position to the outer periphery of the spiral form part; the spiral form parts are disposed in matrix in a state where the center positions thereof are separated from each other by a predetermined distance; and the spiral form parts that are adjacently disposed in a row direction and a column direction are shaped so that turning directions are opposite.

In the shaped object according to the second aspect of the present invention, in at least one cross section of the structure, the major axes of the spiral form parts that are adjacent in the row direction and the column direction may be orthogonal to each other.

In the shaped object according to the second aspect of the present invention, in the cross section of the structure where the major axes of the spiral form parts are orthogonal to each other, an end on a major axis side and an end on a minor axis side in the spiral form parts that are adjacent in the row direction and the column direction may be in contact with each other.

In the shaped object according to the second aspect of the present invention, in at least one cross section of the structure, the major axes of the spiral form parts may be parallel to each other.

In the shaped object according to the second aspect of the present invention, in the cross section of the structure where the spiral form parts are parallel to each other, ends of the spiral form parts on a major axis side that are diagonally adjacent to each other with respect to the row direction and the column direction may be in contact with each other.

In the shaped object according to the second aspect of the present invention, a ratio of a length of the major axis to a length of the minor axis of the spiral form part may be at least 2.8 to 1.

In the shaped object according to the second aspect of the present invention, the cross section of the spiral form part may have a shape along the major axis that is symmetric about the minor axis.

In the shaped object according to the second aspect of the present invention, the cross section of the spiral form part may have an elliptic, oval, or rhombic shape.

The shaped object according to the second aspect of the present invention may further include a side wall and a bottom wall, wherein: the structure may be surrounded by the bottom wall, the side wall, and the ceiling wall; and the spiral form parts may be configured to connect between the bottom wall and the ceiling wall.

The shaped object according to the second aspect of the present invention may form at least a part of a mold.

By the first aspect of the present invention, the shaped object with a smaller weight can be easily shaped while suppressing the decrease in rigidity. In addition, the ceiling wall can be easily shaped without a support material.

By the second aspect of the present invention, the shaped object with a smaller weight can be obtained while suppressing the decrease in rigidity. In addition, the shaped object in which the ceiling wall is easily shaped can be obtained.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Detailed description is hereinafter made with respect to a preferred embodiment of a shaping method and a shaped object according to the present invention with reference to the drawings.

Embodiment

First, a three-dimensional shaping apparatus to perform a shaping method according to the present embodiment is described briefly.

Figure 1:
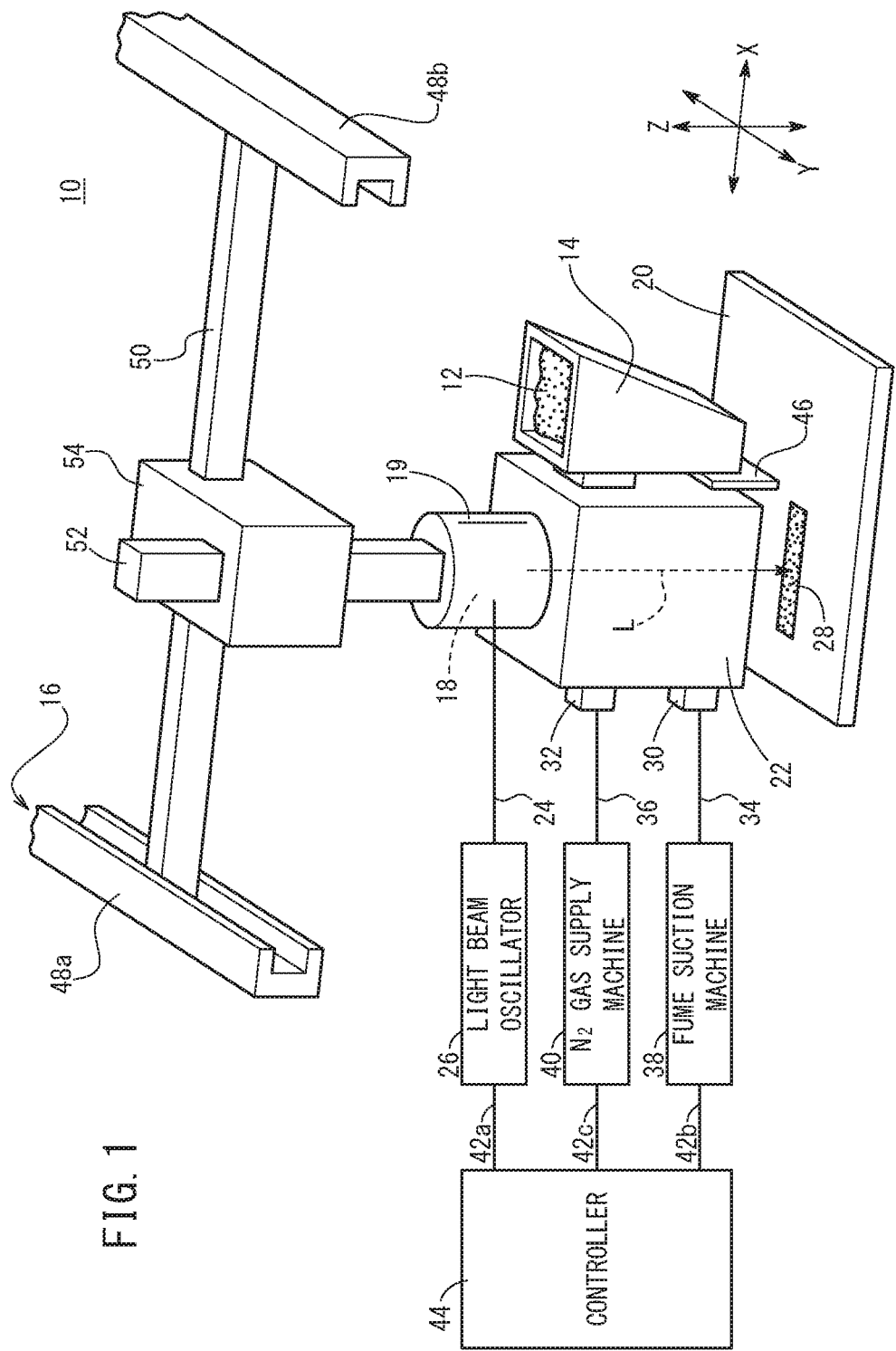
FIG. 1 is a perspective view that schematically illustrates a main part of a three-dimensional shaping apparatus to obtain a three-dimensional shaped object.

FIG. 1 is a perspective view that schematically illustrates a main part of a three-dimensional shaping apparatus 10 to obtain a three-dimensional shaped object. This three-dimensional shaping apparatus 10 includes a storage hopper 14 that stores powder 12 corresponding to a starting material for the shaped object, and a light beam irradiation part 18 that is movable via a gantry 16 in three axes corresponding to an arrow X direction, an arrow Y direction, and an arrow Z direction in FIG. 1. The light beam irradiation part 18 is covered with a protection cover 19 and integrally moves with the protection cover 19.

Moreover, the three-dimensional shaping apparatus 10 includes a base that is not shown. On the base, a table (shaping bed) 20 on which the shaped object is mounted is provided. In addition, to an end of the light beam irradiation part 18, a shroud 22 whose lower end is open is provided. A light beam L emitted from the light beam irradiation part 18 travels in the shroud 22. Note that the light beam irradiation part 18 is electrically connected to a light beam oscillator 26 through an optical fiber cable 24.

To the shroud 22, a fume suction machine attachment part 30 and a $N_2$ gas supply machine attachment part 32 are provided. To these fume suction machine attachment part 30 and $N_2$ gas supply machine attachment part 32, a fume suction machine 38 and an $N_2$ gas supply machine 40 are connected through an intake pipe 34 and a gas supply pipe 36, respectively.

In the above configuration, the light beam oscillator 26, the fume suction machine 38, and the $N_2$ gas supply machine 40 are electrically connected to a controller 44 through signal lines 42a to 42c, respectively. That is to say, oscillation (irradiation) of the light beam L, supply of $N_2$ gas into the shroud 22, and suction of the fume in the shroud 22 are performed under a control operation of the controller 44.

The shroud 22 supports the storage hopper 14. To a lower end surface of the storage hopper 14, a shutter (not shown) that can be opened and closed by a control signal from the controller 44 is provided. When the shutter is opened, the powder 12 in the storage hopper 14 is supplied onto the table 20. On the other hand, when the shutter is closed, supply of the powder 12 is stopped.

A blade 46 is supported at a lower end part of the storage hopper 14 so that the blade 46 is held between the shroud 22 and the storage hopper 14. This blade 46 plays a role of leveling the powder 12 supplied onto the table 20.

Note that the powder 12 may be any powder that can be sintered (or melted and fixed) by the light beam L and is not limited to a particular kind of powder. For example, the powder 12 may be metal powder or resin powder.

The light beam irradiation part 18 can be inclined by a gear mechanism, for example, and can be stopped in an inclined state. By inclining the light beam irradiation part 18 as above, an irradiation angle of the light beam L can be arbitrarily changed.

The gantry 16 for integrally moving the light beam irradiation part 18, the shroud 22, and the storage hopper 14 includes a pair of fixed guide rails 48a, 48b, a movable guide rail 50 that is displaceable along a longitudinal direction of the fixed guide rails 48a, 48b, and a scanner 54 that is displaceable along the movable guide rail 50 and supports a prop 52.

In this case, both the fixed guide rails 48a, 48b extend along the arrow Y direction in FIG. 1. On the other hand, the movable guide rail 50 is extended between the fixed guide rail 48a and the fixed guide rail 48b. Therefore, the movable guide rail 50 extends along the arrow X direction that is orthogonal to the arrow Y direction corresponding to the extending direction of the fixed guide rails 48a, 48b.

The movable guide rail 50 is displaceable under an operation of a first driving source (not shown) along the fixed guide rails 48a, 48b, that is, the arrow Y direction. In addition, the scanner 54 is displaceable under an operation of a second driving source (not shown) along the movable guide rail 50 (arrow X direction). The prop 52 that supports the light beam irradiation part 18 is displaceable under an operation of a third driving source (not shown) along a vertical direction (arrow Z direction). Since the movable guide rail 50, the scanner 54, and the prop 52 are displaceable as above, the light beam irradiation part 18, the shroud 22, and the storage hopper 14 can be placed at any coordinate. These first driving source to third driving source are driven in accordance with the control of the controller 44.

Next, a basic shaping process of the three-dimensional shaping apparatus 10 will be described.

In order to fabricate the three-dimensional shaped object, first, the controller 44 controls the first driving source and the second driving source so as to displace the movable guide rail 50 and the scanner 54. That is to say, the light beam irradiation part 18 and the storage hopper 14 are moved along an X-Y plane under an operation of the gantry 16 so as to be each placed at a predetermined (x, y) coordinate.

After that, the controller 44 opens the shutter provided to the lower end part of the storage hopper 14. Accordingly, the powder 12 stored in the storage hopper 14 falls onto the table 20.

In this state, the controller 44 displaces the light beam irradiation part 18 and the storage hopper 14 along at least one of the arrow X direction and the arrow Y direction in a similar manner. As a result, the powder 12 is supplied onto the table 20 continuously in a linear shape and leveled by the blade 46. Thus, a powder layer 28 with a predetermined thickness is formed. After each of the light beam irradiation part 18 and the storage hopper 14 is displaced along a predetermined trajectory set in advance, the shutter is closed so that the supply of the powder 12 is stopped.

Before and after this displacement, the $N_2$ gas supply machine 40 and the fume suction machine 38 are controlled under the control operation of the controller 44. That is to say, the $N_2$ gas is supplied into the shroud 22 through the gas supply pipe 36 and the gas in the shroud 22 is exhausted through the intake pipe 34. Thus, an atmosphere in the shroud 22 is circulated.

Next, the controller 44 controls the third driving source so as to move the prop 52 down along the arrow Z direction and to place the light beam irradiation part 18 at a predetermined z coordinate.

Next, the light beam oscillator 26 is controlled under the control operation of the controller 44 so that the light beam L is emitted from the light beam irradiation part 18. The light beam L is incident into the powder layer 28. The fume generated by this incidence is suctioned and exhausted to the outside of the shroud 22 through the intake pipe 34 under an operation of the fume suction machine 38.

At a part where the light beam L is incident, the temperature of the powder 12 increases. Thus, a part of the powder 12 is melted and sintered, or melted and fixed. That is to say, particles of the powder 12 connect to each other; thus, the powder layer 28 is solidified. Note that, an incidence position of the light beam L to the powder layer 28 by the light beam irradiation part 18 is displaced (scanning is performed) along the X-Y plane by the gantry 16.

Next, another powder 12 is supplied onto the powder layer 28 that has been solidified as above and thus, the powder layer 28 is stacked or deposited. Before this stacking, the third driving source is controlled again so that the prop 52 and the like slightly ascend. Thus, the shroud 22 and the light beam irradiation part 18 slightly ascend.

After that, by irradiating another powder layer 28 with the light beam L, this powder layer 28 is solidified. Needless to say, the above work is performed in accordance with the above description.

This work, that is, the stacking and the solidification of the powder layer 28 are repeated so that the three-dimensional shaped object is formed.

Figure 2:
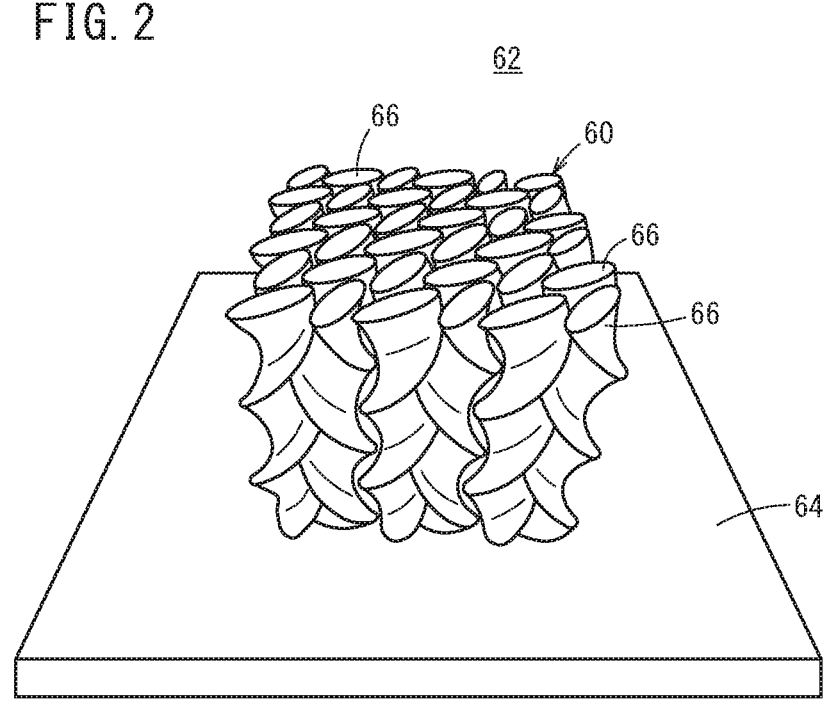
FIG. 2 is a perspective view illustrating an external appearance of the shaped object shaped by the three-dimensional shaping apparatus in FIG. 1.
Figure 3:
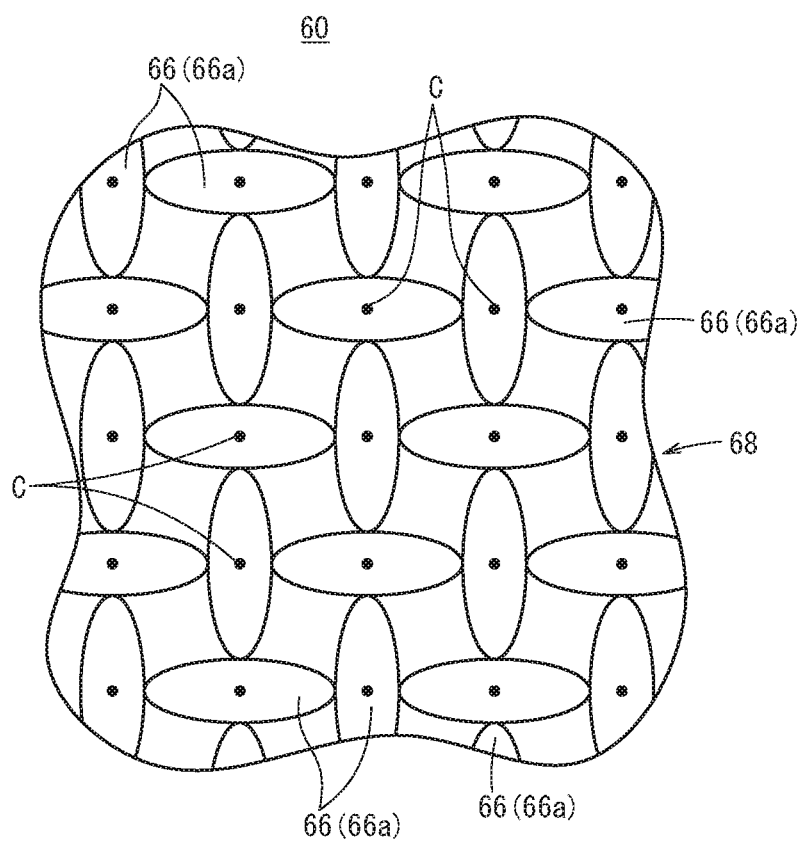
FIG. 3 is a cross-sectional view of a structure at a first position in a stacking direction of the shaped object in FIG. 2.
Figure 4:
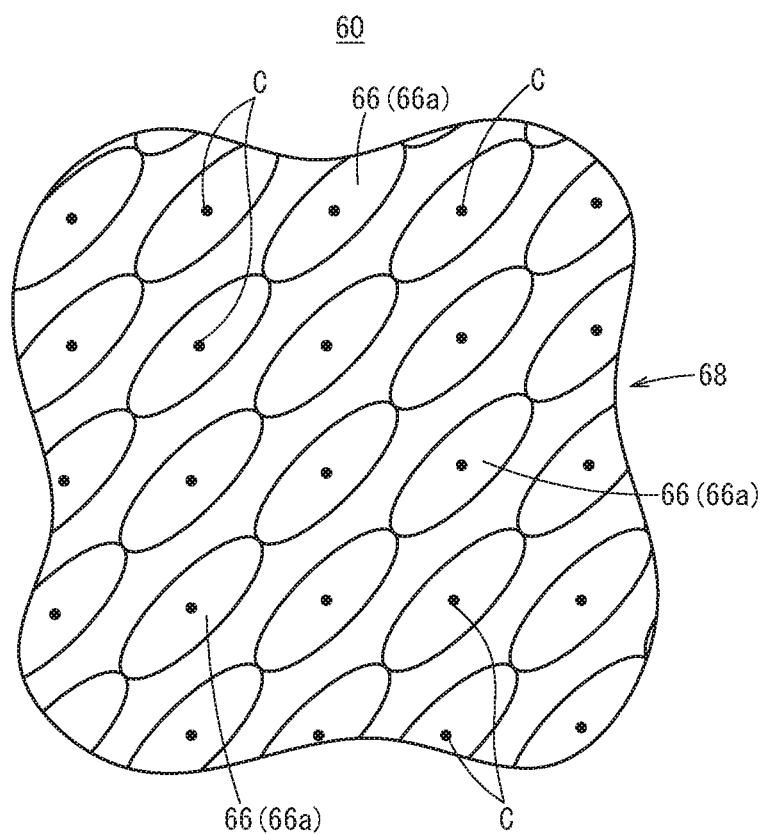
FIG. 4 is a cross-sectional view of the structure at a second position in the stacking direction of the shaped object in FIG. 2.

In the present embodiment, a shaped object 62 including a structure 60 as illustrated in FIG. 2 is formed. FIG. 2 is a perspective view illustrating an external appearance of the shaped object 62. FIG. 3 is a cross-sectional view of the structure 60 (shaped object 62) at a first position in a stacking direction of the shaped object 62. FIG. 4 is a cross-sectional view of the structure 60 (shaped object 62) at a second position in the stacking direction of the shaped object 62. Note that in FIG. 2 to FIG. 4, a ceiling wall is denoted by a reference sign 64 and a side wall that covers a side surface of the structure 60 and a bottom wall that is shaped first are not shown. The ceiling wall 64 is shaped last. For example, this shaped object 62 is used for a mold and constitutes at least a part of the mold. The structure 60 is surrounded by the bottom wall, the side wall, and the ceiling wall 64.

The structure 60 includes a plurality of spiral form parts 66. Each spiral form part 66 has a cross section with an elliptic shape and extends in the stacking direction while turning with respect to a center position C of the elliptic shape. Therefore, the plurality of spiral form parts 66 connect between the bottom wall and the ceiling wall 64. The plurality of spiral form parts 66 are disposed in matrix in a state where the center positions C are separated from each other by a predetermined distance. The spiral form parts 66 that are adjacently disposed in a row direction and a column direction are shaped so that the turning directions are opposite. That is to say, if one spiral form part 66 has a spiral shape that is turned in a clockwise direction, the spiral form parts 66 that are adjacent to the one spiral form part 66 in the row direction and the column direction have a spiral shape that is turned in a counterclockwise direction.

In the cross-sectional view of the structure 60 at the first position as illustrated in FIG. 3, in the spiral form parts 66 that are adjacent in the row direction and the column direction, major axes thereof are orthogonal to each other and an end on the major axis side and an end on a minor axis side are in contact (connected) with each other.

In the cross-sectional view of the structure 60 at the second position as illustrated in FIG. 4, all the major axes of the spiral form parts 66 are parallel to each other. In addition, the ends of the spiral form parts 66 on the major axis side that are diagonally adjacent to each other with respect to the row direction (or column direction) are in contact (connected) with each other. Therefore, the ratio of the major axis to the minor axis of the spiral form part 66 is at least 2.8 to 1. Thus, the ratio of the major axis to the minor axis of the spiral form part 66 may be 3 to 1 (the major axis:the minor axis=3:1) or 5 to 1 (the major axis:the minor axis=5:1). This ratio of the major axis to the minor axis is determined based on the rigidity and the lightness of the structure 60. Note that this ratio of the major axis to the minor axis aims to enhance the rigidity of the entire shaped object by partially connecting the spiral form parts 66 to each other. Thus, if the rigidity is sufficient, the ratio is not particularly limited to these values.

Next, description is made with respect to the shaping method for the structure 60 as illustrated in FIG. 2 to FIG. 4, by using the three-dimensional shaping apparatus 10.

First, by supplying the powder 12 onto the table 20 and leveling the powder 12 as described above, the powder layer 28 is formed. Then, by performing the scanning while irradiating the powder layer 28 with the light beam L, a constituent layer (first constituent layer) 68 that constitutes a part of the structure 60 is shaped. This constituent layer 68 includes a plurality of spiral constituent parts 66a each of which has a cross section with an elliptic shape when viewed from the stacking direction. The spiral constituent part 66a is a part that is sintered or melted and fixed by the irradiation with the light beam L. The scanning is performed while being irradiated with the light beam L so that the spiral constituent parts 66a are disposed in matrix in a state where the center positions C are separated from each other by a predetermined distance.

For convenience, in the first constituent layer 68, the major axes of the spiral constituent parts 66a that are adjacent in the row direction and the column direction are orthogonal to each other as illustrated in FIG. 3. In addition, the end on the major axis side is in contact (connected) with the end on the minor axis side. Note that the bottom wall is shaped before the first constituent layer 68 is shaped, and a layer (first layer) that forms the side wall is also shaped when the first constituent layer 68 is shaped.

After that, by supplying the powder 12 onto the first constituent layer 68 and leveling the powder 12, the powder layer 28 is formed. Then, by performing the scanning while irradiating the powder layer 28 with the light beam L, the constituent layer (second constituent layer) 68 that constitutes a part of the structure 60 is shaped. In the shaping of the second constituent layer 68, the scanning is performed while being irradiated with the light beam L so that the spiral constituent parts 66a that are adjacent in the row direction and the column direction are in a state of being turned with respect to the center positions C by a predetermined angle in the opposite directions.

Thus, the center position C of the spiral constituent part 66a of the second constituent layer 68 coincides with the center position C of the spiral constituent part 66a of the first constituent layer 68 on which the spiral constituent part 66a of the second constituent layer 68 is stacked. In addition, the spiral constituent part 66a of the second constituent layer 68 is in a state of being turned by the predetermined angle with respect to the spiral constituent part 66a of the first constituent layer 68 on which the spiral constituent part 66a of the second constituent layer 68 is stacked. Note that the layer (second layer) that forms the side wall is shaped as well when the second constituent layer 68 is shaped.

After that, by supplying the powder 12 onto the second constituent layer 68 and leveling the powder 12, the powder layer 28 is formed. Then, by performing the scanning while irradiating the powder layer 28 with the light beam L, the constituent layer (third constituent layer) 68 that constitutes a part of the structure 60 is shaped. Even in the shaping of the third constituent layer 68, the scanning is performed while being irradiated with the light beam L so that the spiral constituent parts 66a that are adjacent in the row direction and the column direction are in a state of being turned further with respect to the center positions C by a predetermined angle in the opposite directions.

Thus, the center position C of the spiral constituent part 66a of the third constituent layer 68 coincides with the center position C of the spiral constituent part 66a of the second constituent layer 68 on which the spiral constituent part 66a of the third constituent layer 68 is stacked. In addition, the spiral constituent part 66a of the third constituent layer 68 is in a state of being turned by the predetermined angle with respect to the spiral constituent part 66a of the second constituent layer 68 on which the spiral constituent part 66a of the third constituent layer 68 is stacked. Note that the layer (third layer) that forms the side wall is shaped as well when the third constituent layer 68 is shaped.

By repeating the process as above a predetermined number of times, the plurality of spiral constituent parts 66a are stacked so that the plurality of spiral form parts 66 are shaped. Thus, the shaped object 62 as illustrated in FIG. 2 can be obtained. Therefore, the shaped object 62 with a smaller weight can be easily shaped while suppressing the decrease in rigidity. In addition, since the plurality of spiral form parts 66 are shaped, the ceiling wall 64 can also be easily shaped.

Conventionally, in the shaping of a hollow shaped object, when the ceiling wall is shaped, the powder that forms the ceiling wall needs to be shaped in a hollow part where there is no constituent layer. Thus, the powder falls down into the hollow part so that an even or flat wall surface cannot be shaped. However, this problem can be avoided. That is to say, since the spiral constituent part 66a is turned in every shaping of the constituent layer 68, the powder 12 to be supplied is held in a constituent layer form. Thus, the powder 12 does not fall down into the hollow part so that the even wall surface can be shaped.

Note that the ceiling wall 64 is shaped by, after the structure 60 is shaped, supplying the powder 12 onto the structure 60, leveling the powder 12 so that the powder layer 28 is formed, and irradiating the powder layer 28 with the light beam L. This ceiling wall 64 may include one layer (constituent layer) or a plurality of layers (constituent layers) that are stacked.

Modification

In the description of the above embodiment, the cross-sectional shape of the spiral form part 66 and the shape of the spiral constituent part 66a when viewed from the stacking direction are elliptic; however, the shape is not limited to the elliptic shape. That is to say, the cross section of the spiral form part 66 (spiral constituent part 66a) may have such a shape that the major axis and the minor axis are orthogonal to each other. Here, the major axis is an axis including a longest direct distance from the center position C of the spiral form part 66 (spiral constituent part 66a) to the outer periphery of the spiral form part 66 (spiral constituent part 66a), and the minor axis is an axis including a shortest direct distance from the center position C to the outer periphery of the spiral form part 66 (spiral constituent part 66a). It is adequate that the cross section of the spiral form part 66 (spiral constituent part 66a) has a shape along the major axis that is symmetric about the minor axis. For example, the cross section of the spiral form part 66 (spiral constituent part 66a) may have an oval shape or a rhombic shape.

Technical Idea Obtained from Embodiment

Description is hereinafter made of technical ideas conceived from the above embodiment.

First Technical Idea

The shaping method shapes the shaped object (62) including the structure (60) and the ceiling wall (64) configured to support the structure (60) by using the three-dimensional shaping apparatus (10). The shaping method includes the structure shaping step of shaping the structure (60), by shaping a constituent layer (68) constituting a part of the structure (60) by irradiation with the light beam (L), repeatedly a predetermined number of times, so that the constituent layers (68) are stacked into the structure (60); and the ceiling wall shaping step of shaping the ceiling wall (64) by irradiation with the light beam (L). The constituent layer (68) includes the plurality of spiral constituent parts (66a); and the spiral constituent part (66a) has a shape in which, when viewed from the stacking direction, the major axis and the minor axis are orthogonal to each other, the major axis corresponding to the axis including the longest direct distance from the center position (C) of the spiral constituent part (66a) to the outer periphery of the spiral constituent part (66a) and the minor axis corresponding to the axis including the shortest direct distance from the center position (C) to the outer periphery of the spiral constituent part (66a). The spiral constituent parts (66a) are disposed in matrix in the state where the center positions (C) thereof are separated from each other by a predetermined distance. In the structure shaping step, the structure (60) that includes the plurality of spiral form parts (66) each extending in the stacking direction while turning with respect to the center position (C) is shaped by the irradiation with the light beam (L) so that, in every shaping of the constituent layer (68), the spiral constituent parts (66a) that are adjacent in the row direction and the column direction are in the state of being turned with respect to the center position (C) by a predetermined angle in opposite directions.

Thus, the shaped object (62) with a smaller weight can be easily shaped while suppressing the decrease in rigidity. In addition, the ceiling wall (64) can be easily shaped without a support material.

In at least one constituent layer (68) of the constituent layers (68) that are stacked, the major axes of the spiral constituent parts (66a) that are adjacent in the row direction and the column direction may be orthogonal to each other. Thus, the shaped object (62) with a smaller weight can be easily shaped while suppressing the decrease in rigidity. In addition, the ceiling wall (64) can be easily shaped without a support material.

In the spiral constituent parts (66a) that are adjacent in the row direction and the column direction and whose major axes are orthogonal to each other, the end on the major axis side and the end on the minor axis side may be in contact with each other. Thus, the decrease of the rigidity of the shaped object (62) can be further suppressed.

In at least one constituent layer (68) of the constituent layers (68) that are stacked, the major axes of the spiral constituent parts (66a) may be parallel to each other. Thus, the shaped object (62) with a smaller weight can be easily shaped while suppressing the decrease in rigidity. In addition, the ceiling wall (64) can be easily shaped without a support material.

In the constituent layer (68) where the major axes of the spiral constituent parts (66a) are parallel to each other, ends of the spiral constituent parts (66a) on the major axis side that are diagonally adjacent to each other with respect to the row direction and the column direction may be in contact with each other. Thus, the decrease of the rigidity of the shaped object (62) can be further suppressed.

The ratio of the length of the major axis to the length of the minor axis of the spiral constituent part (66a) may be at least 2.8 to 1. Thus, the shaped object (62) with a smaller weight can be easily shaped while suppressing the decrease in rigidity. In addition, the ceiling wall (64) can be easily shaped without a support material.

The spiral constituent part (66a) may have the shape along the major axis that is symmetric about the minor axis when viewed from the stacking direction. Thus, the shaped object (62) with a smaller weight can be easily shaped while suppressing the decrease in rigidity. In addition, the ceiling wall (64) can be easily shaped without a support material.

The spiral constituent part (66a) may have an elliptic, oval, or rhombic shape when viewed from the stacking direction. Thus, the shaped object (62) with a smaller weight can be easily shaped while suppressing the decrease in rigidity. In addition, the ceiling wall (64) can be easily shaped.

Second Technical Idea

The shaped object (62) fabricated by using the three-dimensional shaping apparatus (10) includes the structure (60) that is shaped by stacking the plurality of constituent layers (68) and the ceiling wall (64) configured to support the structure (60). The structure (60) includes the plurality of spiral form parts (66) each extending in the stacking direction while turning with respect to the center position (C). The cross section of the spiral form part (66) has a shape in which the major axis and the minor axis are orthogonal to each other, the major axis corresponding to the axis including the longest direct distance from the center position (C) to the outer periphery of the spiral form part (66) and the minor axis corresponding to the axis including the shortest direct distance from the center position (C) to the outer periphery of the spiral form part (66). The spiral form parts (66) are disposed in matrix in the state where the center positions (C) thereof are separated from each other by a predetermined distance; and the spiral form parts (66) that are adjacently disposed in the row direction and the column direction are shaped so that the turning directions are opposite.

Thus, the shaped object (62) with a smaller weight can be obtained while suppressing the decrease in rigidity. In addition, the shaped object (62) in which the ceiling wall (64) is easily shaped can be obtained.

In at least one cross section of the structure (60), the major axes of the spiral form parts (66) that are adjacent in the row direction and the column direction may be orthogonal to each other. Thus, the shaped object (62) with a smaller weight can be obtained while suppressing the decrease in rigidity. In addition, the shaped object (62) in which the ceiling wall (64) is easily shaped can be obtained.

In the cross section of the structure (60) where the major axes of the spiral form parts (66) are orthogonal to each other, the end on the major axis side and the end on the minor axis side in the spiral form parts (66) that are adjacent in the row direction and the column direction may be in contact with each other. Thus, the decrease of the rigidity of the shaped object (62) can be further suppressed.

In at least one cross section of the structure (60), the major axes of the spiral form parts (66) may be parallel to each other. Thus, the shaped object (62) with a smaller weight can be obtained while suppressing the decrease in rigidity. In addition, the shaped object (62) in which the ceiling wall (64) is easily shaped can be obtained.

In the cross section of the structure (60) where the spiral form parts (66) are parallel to each other, ends of the spiral form parts (66) on the major axis side that are diagonally adjacent to each other with respect to the row direction and the column direction may be in contact with each other. Thus, the decrease of the rigidity of the shaped object (62) can be further suppressed.

The ratio of the length of the major axis to the length of the minor axis of the spiral form part (66) may be at least 2.8 to 1. Thus, the shaped object (62) with a smaller weight can be obtained while suppressing the decrease in rigidity. In addition, the shaped object (62) in which the ceiling wall (64) is easily shaped can be obtained.

The cross section of the spiral form part (66) may have the shape along the major axis that is symmetric about the minor axis. Thus, the shaped object (62) with a smaller weight can be obtained while suppressing the decrease in rigidity. In addition, the shaped object (62) in which the ceiling wall (64) is easily shaped can be obtained.

The cross section of the spiral form part (66) may have an elliptic, oval, or rhombic shape. Thus, the shaped object (62) with a smaller weight can be obtained while suppressing the decrease in rigidity. In addition, the shaped object (62) in which the ceiling wall (64) is easily shaped can be obtained.

The shaped object (62) may further include the side wall and the bottom wall. The structure (60) may be surrounded by the bottom wall, the side wall, and the ceiling wall (64); and the spiral form parts (66) may be configured to connect between the bottom wall and the ceiling wall (64). The shaped object (62) may form at least a part of the mold.

The present invention is not particularly limited to the embodiments described above, and various modifications are possible without departing from the essence and gist of the present invention.

What is claimed is:

1. A shaping method for shaping a shaped object including a structure and a ceiling wall configured to support the structure by using a three-dimensional shaping apparatus, the method comprising:
    a structure shaping step of shaping the structure, by shaping a constituent layer constituting a part of the structure by irradiation with a light beam, repeatedly a predetermined number of times, so that the constituent layers are stacked into the structure; and
    a ceiling wall shaping step of shaping the ceiling wall by irradiation with the light beam,
    wherein:
    the constituent layer includes a plurality of spiral constituent parts;
    the spiral constituent part has a shape in which, when viewed from a stacking direction, a major axis and a minor axis are orthogonal to each other, the major axis corresponding to an axis including a longest direct distance from a center position of the spiral constituent part to an outer periphery of the spiral constituent part and the minor axis corresponding to an axis including a shortest direct distance from the center position to the outer periphery of the spiral constituent part;
    the spiral constituent parts are disposed in matrix in a state where the center positions thereof are separated from each other by a predetermined distance; and
    in the structure shaping step, the structure that includes a plurality of spiral form parts each extending in the stacking direction while turning with respect to the center position is shaped by the irradiation with the light beam so that, in every shaping of the constituent layer, the spiral constituent parts that are adjacent in a row direction and a column direction are in a state of being turned with respect to the center position by a predetermined angle in opposite directions.

2. The shaping method according to claim 1, wherein in at least one constituent layer of the constituent layers that are stacked, the major axes of the spiral constituent parts that are adjacent in the row direction and the column direction are orthogonal to each other.

3. The shaping method according to claim 2, wherein in the spiral constituent parts that are adjacent in the row direction and the column direction and whose major axes are orthogonal to each other, an end on a major axis side and an end on a minor axis side are in contact with each other.

4. The shaping method according to claim 1, wherein in at least one constituent layer of the constituent layers that are stacked, the major axes of the spiral constituent parts are parallel to each other.

5. The shaping method according to claim 4, wherein in the constituent layer where the major axes of the spiral constituent parts are parallel to each other, ends of the spiral constituent parts on a major axis side that are diagonally adjacent to each other with respect to the row direction and the column direction are in contact with each other.

6. The shaping method according to claim 1, wherein a ratio of a length of the major axis to a length of the minor axis of the spiral constituent part is at least 2.8 to 1.

7. The shaping method according to claim 1, wherein the spiral constituent part has a shape along the major axis that is symmetric about the minor axis when viewed from the stacking direction.

8. The shaping method according to claim 7, wherein the spiral constituent part has an elliptic, oval, or rhombic shape when viewed from the stacking direction.

9. A shaped object fabricated by using a three-dimensional shaping apparatus, comprising a structure that is shaped by stacking a plurality of constituent layers and a ceiling wall configured to support the structure, wherein:
    the structure includes a plurality of spiral form parts each extending in a stacking direction while turning with respect to a center position;
    a cross section of the spiral form part has a shape in which a major axis and a minor axis are orthogonal to each other, the major axis corresponding to an axis including a longest direct distance from the center position to an outer periphery of the spiral form part and the minor axis corresponding to an axis including a shortest direct distance from the center position to the outer periphery of the spiral form part;
    the spiral form parts are disposed in matrix in a state where the center positions thereof are separated from each other by a predetermined distance; and
    the spiral form parts that are adjacently disposed in a row direction and a column direction are shaped so that turning directions are opposite.

10. The shaped object according to claim 9, wherein in at least one cross section of the structure, the major axes of the spiral form parts that are adjacent in the row direction and the column direction are orthogonal to each other.

11. The shaped object according to claim 10, wherein in the cross section of the structure where the major axes of the spiral form parts are orthogonal to each other, an end on a major axis side and an end on a minor axis side in the spiral form parts that are adjacent in the row direction and the column direction are in contact with each other.

12. The shaped object according to claim 9, wherein in at least one cross section of the structure, the major axes of the spiral form parts are parallel to each other.

13. The shaped object according to claim 12, wherein in the cross section of the structure where the spiral form parts are parallel to each other, ends of the spiral form parts on a major axis side that are diagonally adjacent to each other with respect to the row direction and the column direction are in contact with each other.

14. The shaped object according to claim 9, wherein a ratio of a length of the major axis to a length of the minor axis of the spiral form part is at least 2.8 to 1.

15. The shaped object according to claim 9, wherein the cross section of the spiral form part has a shape along the major axis that is symmetric about the minor axis.

16. The shaped object according to claim 15, wherein the cross section of the spiral form part has an elliptic, oval, or rhombic shape.

17. The shaped object according to claim 9, further comprising a side wall and a bottom wall, wherein:
 the structure is surrounded by the bottom wall, the side wall, and the ceiling wall; and
 the spiral form parts are configured to connect between the bottom wall and the ceiling wall.

18. The shaped object according to claim 9, wherein the shaped object forms at least a part of a mold.

* * * * *